O. RAUCH.
FARM IMPLEMENT.
APPLICATION FILED FEB. 28, 1918.
1,312,748.
Patented Aug. 12, 1919.
4 SHEETS—SHEET 1.
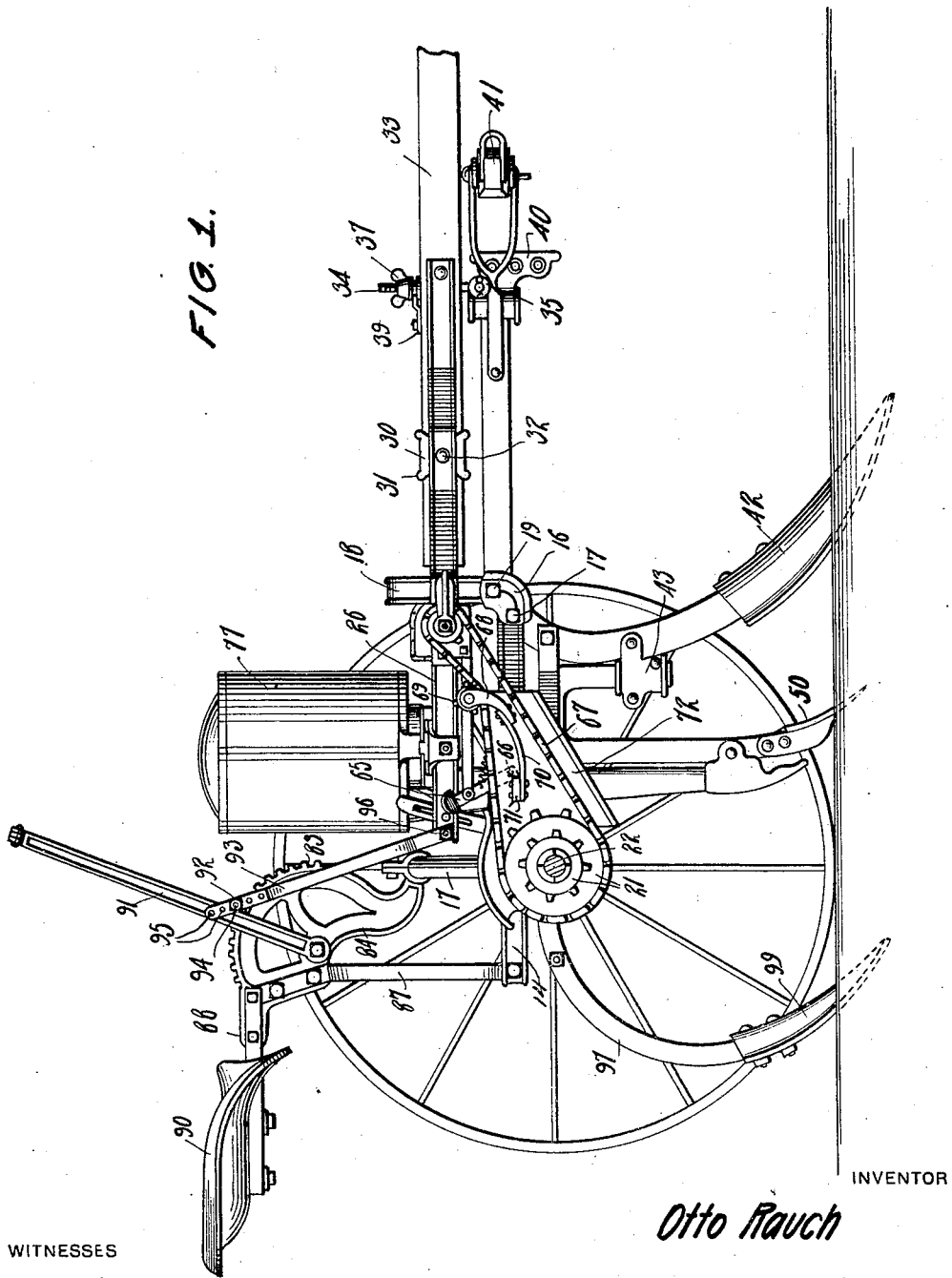
INVENTOR
Otto Rauch
WITNESSES
ATTORNEY

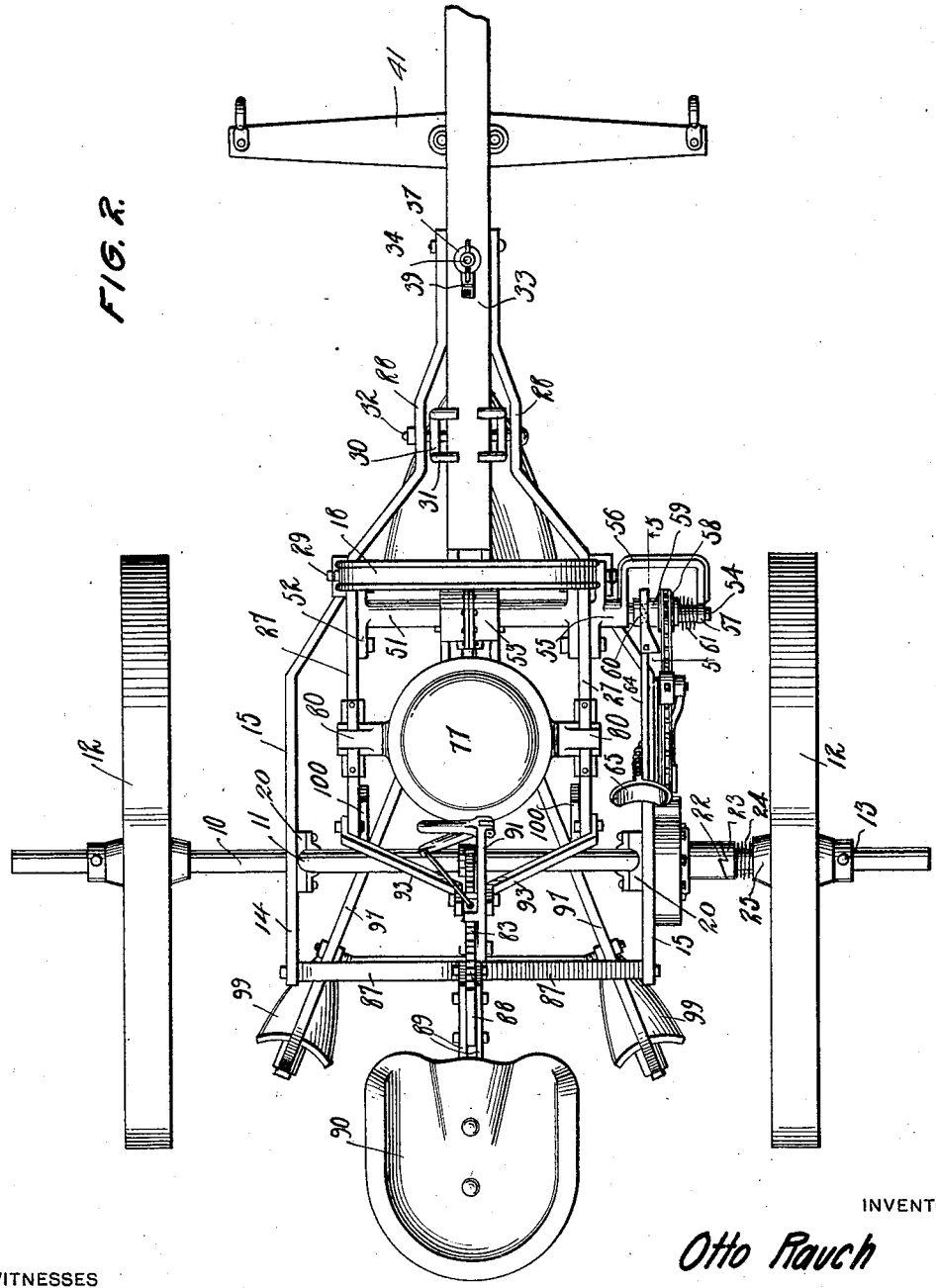

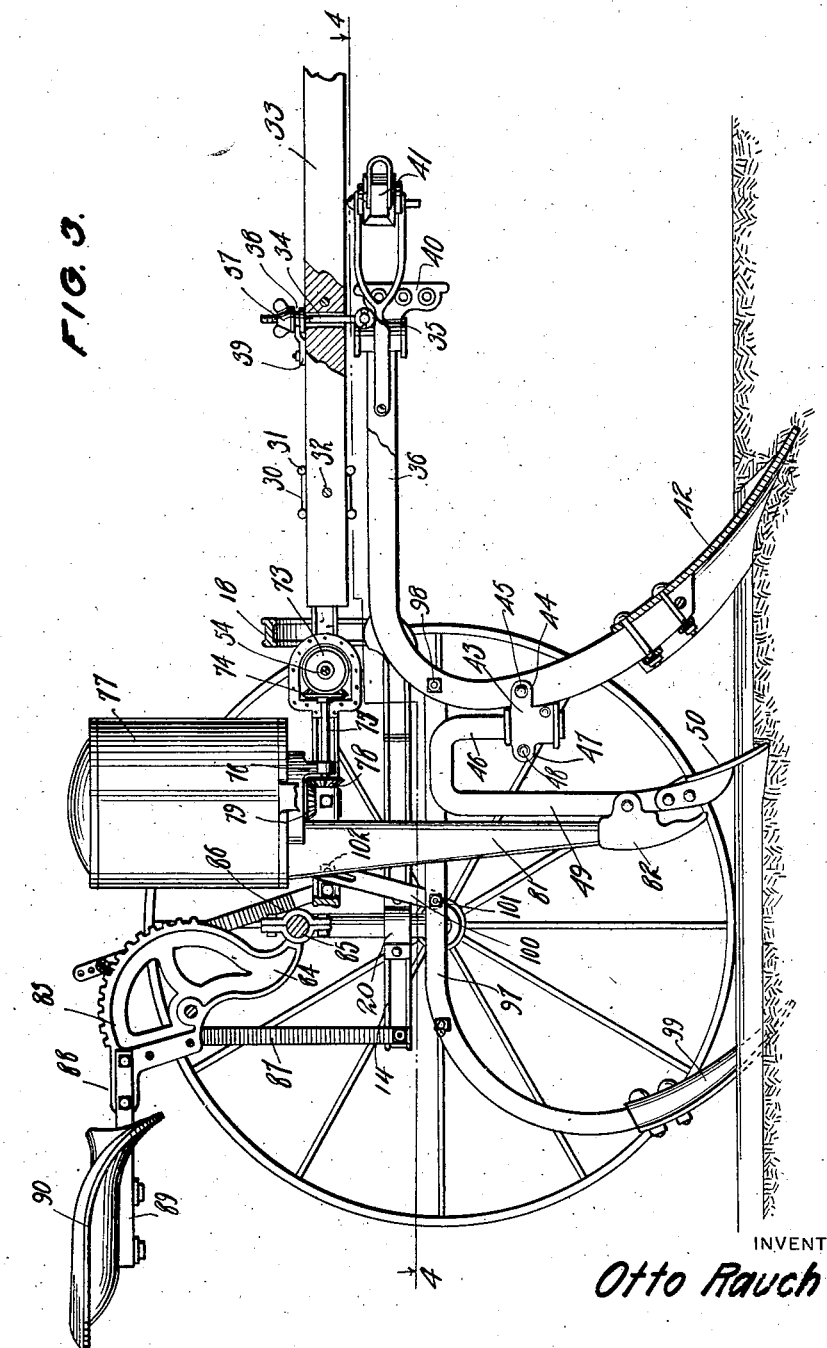

O. RAUCH.
FARM IMPLEMENT.
APPLICATION FILED FEB. 28, 1918.
1,312,748.
Patented Aug. 12, 1919.
4 SHEETS—SHEET 4.
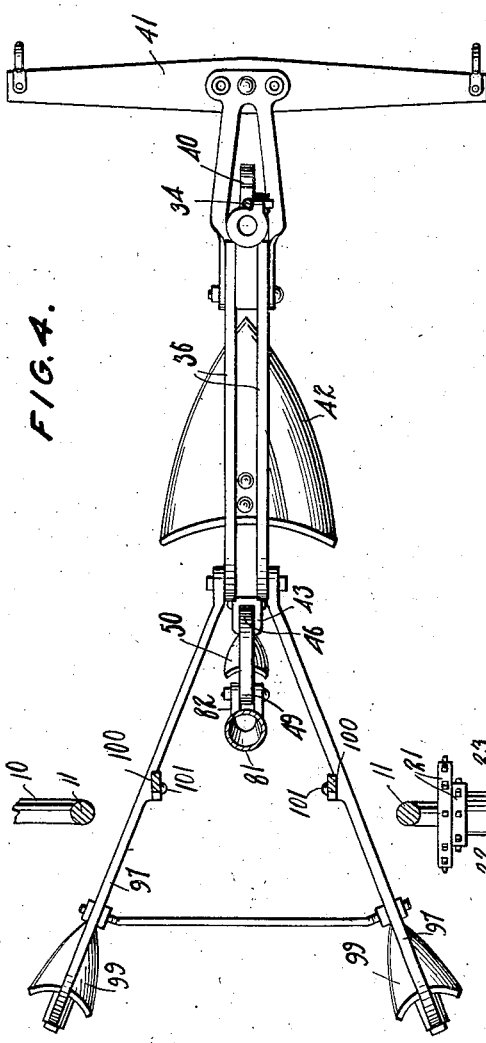
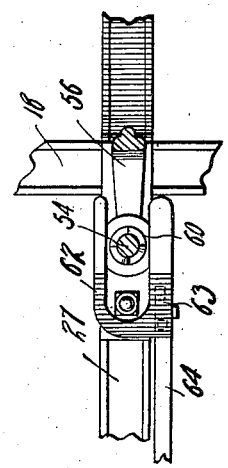
INVENTOR
Otto Rauch
WITNESSES
BY
ATTORNEY

UNITED STATES PATENT OFFICE.

OTTO RAUCH, OF NEW BRAUNFELS, TEXAS.

FARM IMPLEMENT.

1,312,748. Specification of Letters Patent. Patented Aug. 12, 1919.

Application filed February 28, 1918. Serial No. 219,682.

*To all whom it may concern:*

Be it known that I, OTTO RAUCH, a citizen of the United States, residing at New Braunfels, in the county of Comal and State of Texas, have invented certain new and useful Improvements in Farm Implements, of which the following is a specification.

This invention has relation to planters, and has for an object to provide a wheel supported planter adapted to be drawn by a tractor, animal power, etc., and embodying many new and novel features of construction, permitting the facile and universal operation of the machine and the economical construction thereof.

Another object of the invention is to provide a planter embodying an axle of extraordinary length with supporting wheels adjustably mounted thereon so as to variously space the supporting wheels to straddle one or more rows, thereby permitting the machine to be used as a cultivator after the seeds have been planted.

Another object of the invention is to provide a planter embodying a wheel supported main frame, and an auxiliary frame of novel construction mounted upon the main frame in a manner to permit adjustment of one frame relative to the other, and a plow beam operatively connected to both frames in a manner to permit the plow to be adjusted at various angles relative to the ground or for increasing or decreasing the depth of cut.

Another object of the invention is to provide a planter including a plow beam, and an auxiliary frame including a tongue, with an adjustable connection between the plow beam and tongue to vary the distance therebetween so as to vary the angle of the plow relative to the ground or to increase or decrease the depth of the cut.

A still further object of the invention is to provide a wheel supported planter including a plurality of sprocket wheels of various sizes to be directly connected to the axle, a planting mechanism of conventional type, and means including a chain adapted to be embraced about any one of the various sized sprockets for driving the planting mechanism so as to permit the seed to be planted at various distances apart.

A still further object of the invention is to provide a corn planter embodying planting mechanism and means for driving the same from the axle, and a clutch mechanism of a new and novel type for connecting or disconnecting the planter mechanism from the axle at will.

In addition to the foregoing my invention comprehends improvements in the details of construction and arrangement of the correlative parts to be hereinafter more fully described and particularly set forth in the appended claims.

In the accompanying drawings in which similar and corresponding parts are designated by the same characters of reference throughout the several views in which they appear;

Figure 1, is a view in side elevation with one wheel removed, of a planter constructed in accordance with my invention.

Fig. 2, is a view thereof in top plan.

Fig. 3, is a longitudinal central section.

Fig. 4, is a horizontal section taken on the line 4—4 of Fig. 3, and

Fig. 5, is a detail vertical section taken on the line 5—5 of Fig. 2.

With reference to the drawings 10 indicates an axle of extraordinary length provided with an upwardly arched portion the vertical members of which are indicated at 11. A pair of supporting wheels 12 are mounted upon the axle at opposite sides of the arched portion for adjustment toward and away from the ends of the axle and to that end set screws 13 are provided to fix the wheels to the axle subsequent to adjustment.

A main frame 14 is provided including side frame members 15, to the forward ends of which are secured angular castings 16 by means of bolts 17. An inverted U-shaped yoke 18 connects the forward ends of said side frame members 15 by connection with the angular castings 16 through the medium of bolts 19 thereby forming a rigid structure. Bearing members 20 are secured to the inner sides of the longitudinal frame members 15 to receive the vertical portion 11 of the crank axle. Loosely mounted upon the horizontal portion of one end of the crank axle is a plurality of rigidly connected sprocket wheels 21 of various diameters having a sleeve formed therewith and provided with a clutch face 22. A clutch member 23 is loosely mounted upon the axle. A coil spring 24 surrounding the axle and bearing at one end against the hub 25 with the terminal of the spring connected thereto and at its other end against the clutch member 23 urging the clutch member with the other end of the spring connected to said clutch member 23 into engagement with the complemental member 22 so that motion of the axle may be transmitted to the sprocket wheels 21. An auxiliary frame indicated generally at 26 is provided, and comprises parallel longitudinal frame bars 27 connected at their rear ends by means of an integrally formed connecting bar, and having their forward ends converging to form spaced bars 28. The forward ends of the parallel portions 27 of the auxiliary frame are pivotally connected by means of bolts 29 to the depending portion of the arched portion 18 of the main frame so as to mount said auxiliarly frame for vertical oscillation. Disposed between the bars 28 of the auxiliary frame are a pair of castings 30 of rectangular configuration having laterally extending integrally formed lugs 31 in the corners thereof, said castings being secured to said bars in spaced relation by means of bolts 32. A tongue 33 is inserted between the frame bars 28, and engaged between the lugs 31 of the castings when the said castings are disposed at opposite sides of the tongue to assist in rigidly connecting the rear end of the tongue to the auxiliary frame. The tongue is formed with a vertical opening through which a bolt 34 projects. The lower end of the bolt is formed with a right-angular portion to enter an apertured lug 35 formed upon the front end of a horizontal plow beam 36. The threaded end of the bolt 34 extends upwardly through the tongue and a wing nut 37 is applied thereto having an annular groove 38 formed in its lower side. An angular plate 39 is then rigidly secured to the upper side of the tongue with one end of the plate inserted in the groove 38 of the wing nut, so that by rotating the wing nut the plow beam and tongue may be moved toward and away from each other for the purposes of adjustment. A clevis construction 40 of conventional type is formed upon the front end of the plow beam for connection to a swingletree 41. The rear end of the plow beam 36 is curved downwardly and forwardly to receive a furrow opener 42, and a bifurcated casting 43 is applied to the rear face of the said depending portion of the plow beam by means of ears 44 formed on said casting which engage opposite sides of the plow standard. A bolt 45 is inserted through said ears and plow standard to secure the casting in place. The casting as stated above is bifurcated to receive the short legs 46 of an inverted U-shaped yoke. The casting is formed with ears 47 at its opposite side to receive a bolt 48 whereby the bolt may be tightened to engage the members of the casting against said members of the leg to secure the yoke in place. The opposite or long end of the yoke as indicated at 49 depends in proximity to the surface of the ground and is provided with a spoon 50 located rearwardly of the furrow opener 42 for a purpose which will be presently noted. A tubular axle housing 51 is located within the auxiliary frame and is provided at opposite ends with laterally extending ears 52 whereby bolts may be penetrated therein and in the side frame members of the auxiliary frame to mount the tubular axle housing therein. To the intermediate portion of the axle housing there is formed a separable casing 53. A shaft 54 extends through said axle housing, and through an opening in the right hand frame member 27 of the auxiliary frame and into a sleeve 55 formed upon the opposite side of said frame bar. The other terminal of the sleeve 55 is formed with a yoke shaped extension 56 which is formed with an apertured enlargement 57 at its free end to receive the shaft 54 to form a bearing therefor. Loosely mounted upon that portion of the shaft 54 which extends through and within the yoke 56 is a sprocket wheel 58 having a clutch member 59 formed thereon for engagement with the complemental clutch member 60 fixedly mounted upon the shaft 54. A coil spring 61 is embraced about the shaft 54 and interposed between the apertured enlargement 57 and the sprocket wheel 58 to normally urge said clutch member 59 into engagement with the clutch member 60. The clutch member 59 is formed with an annular groove to receive the members of a bifurcated member 62 forming a part of a clutch shifting mechanism, one side face of the member 62 being beveled or wedge-shaped as at 63. A bar 64 is secured at one end to said member 62, and said bar is extended rearwardly and connected to a lever 65 fulcrumed at 66 upon one longitudinal frame member 15 of the main frame and provided upon its opposite end with a foot engaging portion whereby the lever may be moved. It will be obvious that if the lever is engaged by the foot so as to push the bar 64 forwardly, the wedge-shaped portion 63 will act to move the clutch member 59 out of engagement with the complemental clutch member. A coil spring acts to retain the parts in an opposite position. An endless chain 67 is provided to connect the sprocket wheel 58 with any one of the sprockets of the series 21 and to take up the slack in the chain due to the difference in size of the sprockets of the series 21 a chain tightener is provided in the form of a bifurcated casting 68 having a sprocket wheel 69 journaled therein to engage the outer surface of the chain. The casting is secured to one end of a leaf spring 70 having its opposite end secured to a lug 71 which projects from one side of the main frame. A guard member 72 may be provided to partly encompass the chain to prevent entanglement of weeds or the clothing therein. Mounted upon the shaft 54 within the casing 53 is a bevel gear 73 which is in meshing engagement with the bevel gear 74 mounted upon the forward end of a longitudinally extending shaft 75. The rear end of the shaft 75 is journaled in a bearing 76 depending from a container 77 containing a conventional type of seed distributing mechanism. The rear end of the shaft is provided with a bevel gear 78 which meshes with the bevel gear 79 mounted upon a vertical shaft to actuate the seed dropping mechanism. The container 77 may be mounted through the medium of oppositely extending extensions 80 upon the side frame members 27 of the auxiliary frame. A spout 81 depends from the seed distributing mechanism and is connected by means of a casting 82 at its lower end to the long leg 49 of the inverted yoke member which is secured to the plow standard as described above so that the seed dropping from the spout may be directed in the rear of the spoon 50. A toothed segment 83 is provided, and is located in the rear of the seed container 77 and is provided with a downwardly extending extension 84 formed with a semi-circular casting 85 which partly embraces the intermediate or arched portion of the axle, a mating semi-circular member 86 being subsequently applied to the axle for connection to the member 85 to rigidly secure the segment thereto. The segment is further supported by means of a pair of bars 87 which are supported at their lower ends upon the rear ends of the members 15 of the main frame, and converge upwardly for connection at their upper ends to opposite sides of the segment as shown in the drawing. The segment 83 is formed with a rearward extension 88 designed to support a horizontal bar 89 to the rear end of which a seat 90 is secured. Fulcrumed upon the segment 83 at a point concentric with the outer surface thereof is a lever 91 formed at its front edge with an apertured enlargement 92. A pair of bars 93 are provided having their upper ends converging and engaged upon opposite ends of the apertured enlargement 92 whereby a bolt 94 may enter any one of a series of openings 95 in said bars 93, and the sleeve 92 so as to connect said bars 93 to the lever. The lower ends of the levers are then connected by means of a bolt 96 to the rear end of the auxiliary frame. A suitable locking mechanism may be mounted upon the lever 91 to engage the toothed segment to lock the lever in any adjusted position. A pair of horizontal rearwardly extending arms 97 are provided having their forward ends converging and connected by means of a bolt 98 to the plow standard formed upon the rear end of the plow beam 36. The rear ends of the arms 97 are curved downwardly to support covering plows 99 of conventional type. Each arm 97 is furthermore connected at a point intermediate its ends to an upwardly extending bar 100 through the medium of a bolt 101, said bars 100 being slotted at their upper ends to receive bolts 102 which also enter openings in the auxiliary frame whereby to secure the bars 100 in place. It will be obvious that by loosening the bolts the arms 97 may be adjusted vertically relative to the auxiliary frame and held in adjusted position by retightening the bolts.

In operation, as the machine is moved along the ground, the motion of the supporting wheels is transmitted through the clutch members 23 and 22 to the series of pulleys 21 and thence through the endless chain 67 to the sprocket wheel 68. If the clutch members 59 and 60 are in engagement the motion of the sprocket wheel 68 will be transmitted to the shaft 54 and thence through the medium of the bevel gears 73, 74, 78 and 79 to the planting mechanism thereby dislodging the seed so that they may fall through the spout 81 into the ground. During forward travel of the machine the furrow opener 42 creates a furrow and the spoon 50 acts to clear the furrow of weeds so that the seed may be lodged in the ground and subsequently covered by earth thrown into the furrow by means of the covering plows 99 which are immediately in the rear. It will be obvious that by rotating the wing nut 37 at the upper side of the tongue the angle of the plow beam and consequently the plow 42 may be varied relative to the ground. By adjusting the bar 100 when the bolts 102 are loosened, the furrow closing plows 99 may be variously adjusted in a vertical plane. The auxiliary frame may be adjusted relative to the main frame at any angle by means of the lever 91. When it is desired to use the machine in the capacity of a cultivator the planting mechanism may be disconnected and the wheels 12 may be adjusted at any distance apart along the axle, and permitted to rotate freely thereon by loosening the set screws 13. The plow elements 42 and 99 will then serve as cultivating tools, and the wheels may be adjusted so as to straddle two or more furrows. Other ground engaging tools may be mounted upon the main frame if desired. Other uses and advantages will readily occur to those skilled in the art to which this invention appertains.

While I have illustrated and described my invention with some degree of particularity, I realize that in practice various alterations thereover may be made, and I therefore desire to reserve the right and privilege of changing the form of the details of construction or otherwise altering the arrangement of the correlative parts without departing from the spirit of the invention or the scope of the appended claims.

Having thus described my invention what I claim as new and desire to secure by Letters Patent is:—

1. In a planter, a wheel supported frame, a hopper supporting frame including parallel frame bars, an inverted arched member connecting the forward ends of said bars, means connecting the depending portions of said arched member to the wheel supported frame to permit vertical adjustment of the hopper supporting frame, planting mechanism mounted upon said hopper supporting frame and means mounted on the wheel supported frame engaging the hopper supporting frame to adjust the same.

2. In a planter, a frame including parallel side bars, wheels supporting the frame, a hopper supporting frame including parallel side bars, annular castings upon the forward end of said bars, an inverted U-shaped arched member secured at its terminals to said castings, means connecting the terminals of said arched castings to the side bars of the main frame, planting mechanism mounted on the hopper supporting frame and means mounted on the wheel supporting frame engaging the hopper supporting frame to adjust the same relative to the wheel supported frame.

3. In a planter, a frame including frame bars converging at one end, a tongue mounted therebetween having an opening, means rigidly connecting the tongue to the frame bars, a plow beam mounted beneath the tongue, a bolt pivotally connected to the plow beam and passing through the opening in the tongue, a wing nut applied to the bolt having an annular groove, and a plate secured to the tongue entering the groove whereby the plow beam may be adjusted relative to the tongue when the wing nut is rotated.

4. In a planter, a wheel supported frame, a second frame mounted thereon for oscillatory adjustment in a vertical plane, a tongue carried by the second frame, a plow beam located beneath the tongue, means adjustably connecting the plow beam to the tongue to vary the distance therebetween, means for rigidly connecting the rear end of the tongue to the second frame, a plow standard formed on the plow beam, rearwardly extending arms pivotally secured to the standard, and bars pivotally connected to the rearwardly extending arms and having sliding connection and with the second frame to vary the adjustment between the arms and said second frame.

5. In a planter, a wheel supported frame, an arched axle having vertically extending members connecting the wheels and frame, a casting including a toothed segment, a curved extension on one end of the segment, a semicircular bearing plate formed on said extension to embrace the horizontal portion of the axle, a semi-circular plate coacting with the first semi-circular plate to completely embrace the said axle, vertically extending bars on the frame to support the casting, a horizontal extension on the other end of the segmental casting to support a seat, a lever concentrically mounted on the casting, a second frame movable relatively to the wheel supported frame, and a link connecting said second frame with the lever.

In testimony whereof I affix my signature in presence of two witnesses.

OTTO RAUCH.

Witnesses:
   J. R. FUCHS,
   F. GEBERT.